United States Patent

[11] 3,627,379

| [72] | Inventor | Eberhard Faust<br>Bernhausen, Germany |
|---|---|---|
| [21] | Appl. No. | 805,644 |
| [22] | Filed | Mar. 10, 1969 |
| [45] | Patented | Dec. 14, 1971 |
| [73] | Assignee | Recaro Aktiengesellschaft<br>Glarus, Switzerland |
| [32] | Priority | Mar. 13, 1968 |
| [33] | | Germany |
| [31] | | P 17 53 009.5 |

[54] BACKREST FOR A SEAT ESPECIALLY OF A MOTOR VEHICLE
1 Claim, 5 Drawing Figs.

[52] U.S. Cl. .................................................. 297/284, 297/391
[51] Int. Cl. .................................................. A47c 3/00
[50] Field of Search .......................................... 297/284, 460, 455, 410, 391, 396, 353, 458, 230, 231

[56] References Cited
UNITED STATES PATENTS

| 1,444,536 | 2/1923 | Boyce | 297/230 X |
| 1,669,567 | 5/1928 | Linder | 297/230 X |
| 2,831,533 | 4/1958 | Pasquarelli | 297/231 |
| 3,086,817 | 4/1963 | Wilfert | 297/284 |
| 3,259,435 | 7/1966 | Tordon | 297/455 |

FOREIGN PATENTS

| 533,992 | 2/1941 | Great Britain | 297/231 |

*Primary Examiner*—James C. Mitchell
*Attorney*—Ernest G. Montague

ABSTRACT: A padded backrest for a seat which has a frame with an upper and a lower crossbar and lateral arms secured to the crossbars, the upper crossbar extending within the upper part of the padding and the lateral arms being bent forwardly and downwardly from the upper crossbar and carrying lateral padding elements for supporting at least a part of the upper body of an occupant of the seat in lateral directions, and a shell-like padding support secured to the upper and lower crossbars and consisting of a stiff but deformable material. At least the central part of the padding which is adapted to engage with the back of the occupant is slidable upwardly and downwardly along the padding support relative to the frame. At least this central part is provided with transverse pockets into which, if desired, inserts may be placed to change the cross-sectional shape of the backrest.

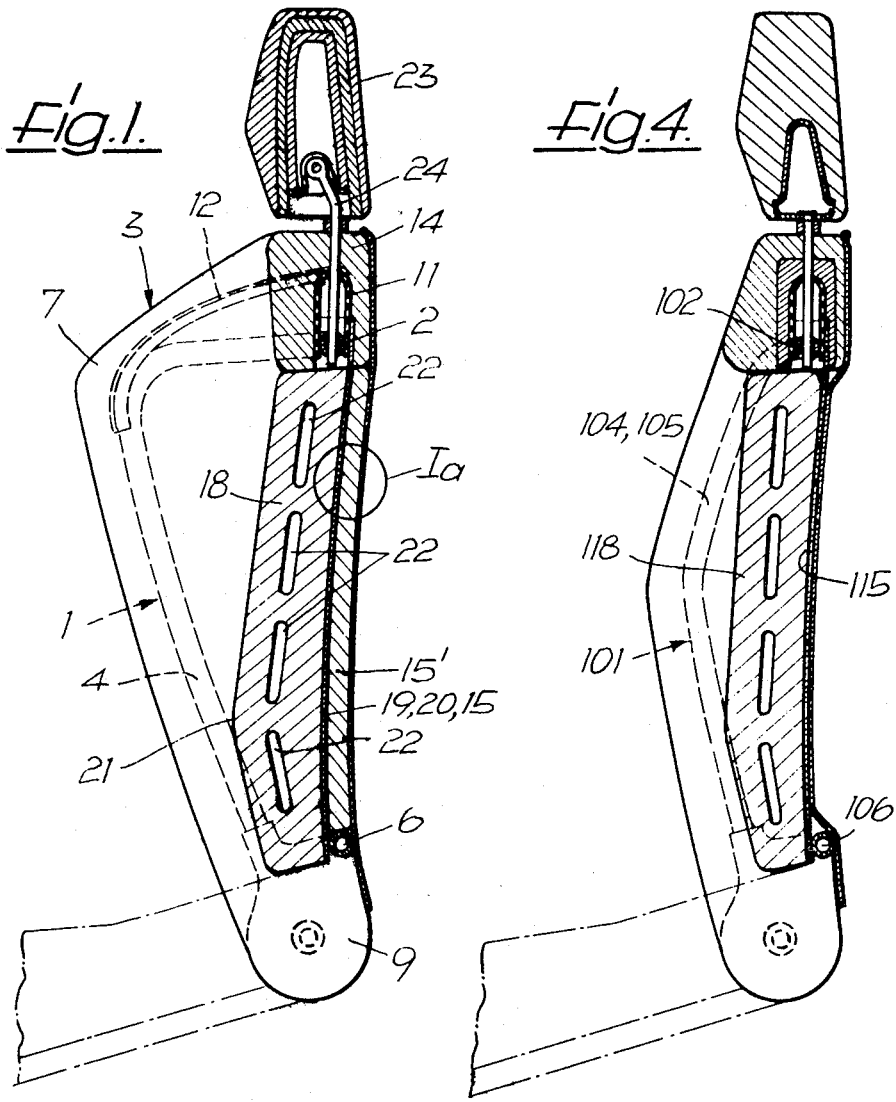

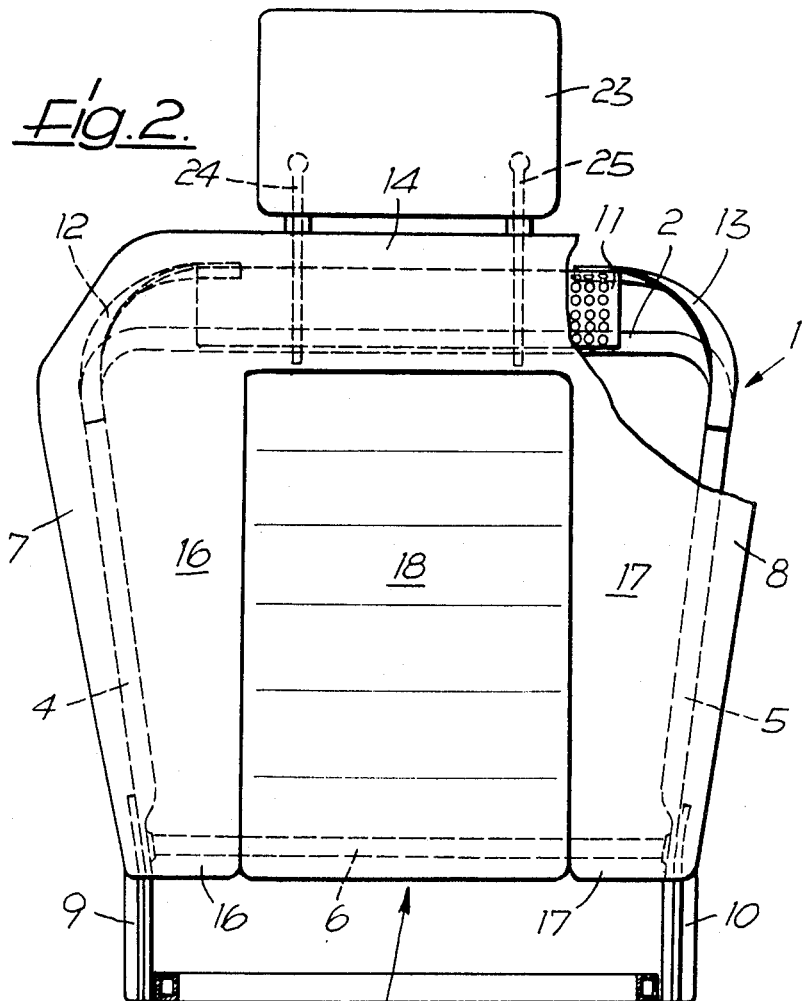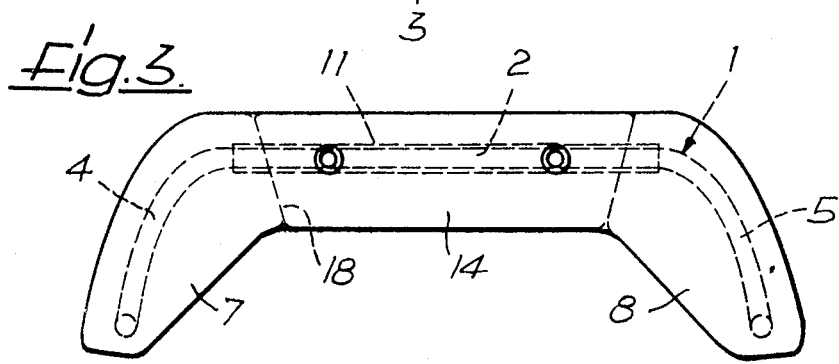

BACKREST FOR A SEAT ESPECIALLY OF A MOTOR VEHICLE

The present invention relates to a backrest for a seat, especially for a motor vehicle, which is provided with lateral forwardly bulging elements and the padding of which is carried by a support which comprises a frame which extends along the lateral edges of this padding.

Since the load-bearing parts of the padding support of any of the backrests of this type as were hitherto known are located at the rear side of the padding, these back rests require additional framelike reinforcements for the lateral bulges in order to give these padding parts the required stability. Such additional reinforcements for the lateral bulges not only increase the weight and costs of the backrests, but if they are connected to the supporting structure of the seat, they also do not permit the backrest to be adjusted to different inclinations.

A considerable disadvantage of these known backrests also consists in the fact that the stiff parts of the padding support, that is, the actual frame of the backrest, always lie within an area against which at a head-on collision of a car in which a front seat with such a backrest is used, an occupant of a rear seat might be propelled, hitting it with his head or legs. Because of the stiffness of the frame of the backrest, there will then be considerable danger that by such an impact an occupant of a rear seat might be seriously injured.

It is an object of the present invention to provide a backrest for a seat, and especially a front seat for a motor vehicle, which, although it properly supports the upper body of its occupant, it still satisfies all safety requirements of protecting an occupant of a rear seat from injuries when thrown from the rear against the backrest, for example, at a head-on collision of a car.

According to the invention, this object is attained by designing a backrest of the type as first described so that its frame extends along the outer front edge of the lateral bulges for at least a part of their length.

Such a frame has the advantage that it provides the necessary support for the lateral bulges of the backrest without requiring any additional reinforcements, and that those sections of this frame which extend along the outer front edge of each lateral bulge do not need to be provided with a protective padding in order to comply with all safety requirements to prevent injuries of a person who is thrown from the rear against the backrest. In these areas, the normal upholstery of the backrest will fully satisfy the requirements of a protective padding.

Independently of the lateral support which the lateral bulges of the backrest provide for the upper body of an occupant of the seat, it is important for a proper support of the upper body of such a person, especially when the backrest has a cross-sectional shape which is intended to provide an anatomically correct support of the spinal column, to insure that the upper part of such a person will always remain at the same level relative to the backrest. Especially in seats of motor vehicles it is, however, impossible to avoid movements of the upper body of an occupant in its longitudinal direction since impacts, for example, from a bumpy road, will be at least partly transmitted to the body. In the known seat constructions these longitudinal movements result in a rubbing of the back of a person in the longitudinal direction along the backrest. According to the invention, this disadvantage may be overcome in a very simple manner by designing that part of the upholstery of the backrest which is continuously in contact with the back of an occupant of the seat, that is, at least the central area of the front padding of the backrest, so as to be slidable in the upward and downward direction of the backrest.

According to a preferred embodiment of the invention, the padding of the backrest is rendered slidable in the upward direction by providing a shell-shaped padding support which is secured to the frame of the backrest. This padding support may be designed so as to permit either the entire padding of the backrest, or if desired, only the central area thereof to be slidable thereon. A sliding only of the central padding area is of advantage since the lateral parts of the padding may then be directly connected to the frame so as to form lateral guides for the central padding element. In order to improve the sliding properties, an antifriction layer or coating may be provided between the slidable padding and the padding support.

In place of a rigid padding support or one which is deformable but nonelastic substantially in the longitudinal direction of the backrest and on which at least a part of the padding is slidable, it is also possible according to the invention to provide a padding support which is secured to the frame of the backrest and is elastic at least in the longitudinal direction of the backrest. In this case, the lower area of the padding may then be firmly connected to this elastic padding support.

Either the rigid or deformable padding support which may consist, for example, of pressboard, compressed pulp, plastic, sheet metal, wire netting, or a textile material, and also the longitudinally elastic padding support which may consist, for example, of a rubber mat or a mat of rubberized or shirred fabric result in a much more simple structure and a lower weight of the backrest than those of all known back seat constructions which are provided with projecting, and therefore reinforced lateral bulges. The backrest according to the invention also has the same advantage over those backrests of prior designs in which the entire backrest together with its frame is resiliently suspended on a main frame so as to be resiliently movable in its longitudinal direction. As compared with the backrest according to the invention, this known construction also has the disadvantage of requiring considerably more space.

If the padding support is provided in the form of an at least partly self-supporting shell, the frame of the backrest does not need to extend up to the upper edge of the backrest. This is of advantage insofar as it permits the protective padding to be omitted or at least to be made of a smaller size than in a backrest in which the frame extends along the upper edge of the backrest.

In order to attain a backrest which provides an anatomically correct support of the spinal column of any person occupying the seat, it is necessary to make the cross-sectional shape of the backrest adjustable. The padding of the backrest according to the invention is for this purpose provide at least within the central area thereof with transversely extending pockets into which different elements may be removably inserted which change the cross-sectional shape and dimensions of the padding. By selecting suitable elements to serve as such inserts, it is a very simple matter to vary the cross-sectional shape of the backrest so as to be in accordance with the shape of the back of different persons. Since these inserts may consist, for example, of foam rubber or foam plastic, their cost is very low. Since the pockets are provided at the inside of the padding, their presence cannot affect the nice appearance of the backrest. As compared with a known device for varying the cross-sectional shape of the backrest by providing the loin-supporting area thereof with adjustable supporting springs, the means according to the invention for effecting such adjustments have the considerable advantage of being much more simple, less expensive, and of a lower weight.

It is now a well-known fact that the proper support of the occupant of a seat also requires a head support. According to one preferred embodiment of the invention, the backrest is therefore made of such a length that, although a headrest may be mounted thereon which is nonadjustable in height, there will only be a narrow gap, if any, between the lower edge of the headrest and the upper edge of the backrest. Such a headrest has the advantage that because of such a narrow gap the supporting rods of the headrest do not need to be provided with any protective padding, and that the lower ends of these supporting rods are located at the inside of the backrest and not within an area thereof against which a person may be thrown from the rear, for example, at a head-on collision of the motor vehicle. The supporting rods of the headrest according to the invention can therefore not cause any injuries which may occur on the supporting rods of adjustable headrests. Since the supporting rods of the headrest according to the invention only need to be made of a short length, they only have to be secured to the upper crossbar of the frame of the backrest.

The features and advantages of the present invention will become further apparent from the following detailed description thereof which is to be read with reference to the accompanying drawings, in which FIG. 1 shows a longitudinal section of a backrest according to the invention;

FIG. 1a shows an enlarged view of the part 1a of FIG. 1;

FIG. 2 shows a front view of the backrest according to FIG. 1;

FIG. 3 shows a top view of the same backrest, but without the headrest; while

FIG. 4 shows a longitudinal section of a backrest according to a modification of the invention.

As illustrated in FIGS. 1 to 3 of the drawings, the backrest according to the invention consists of a yoke-shaped tubular frame 1 which has a central upper crossbar 2 extending horizontally at a certain distance from the upper edge of a padding 3. The two arms 4 and 5 of frame 1 which extend symmetrically to the central longitudinal plane of the backrest and the lower ends of which are welded together with the ends of a lower horizontal tubular crossbar 6 project forwardly and outwardly from this crossbar, as shown in FIGS. 1 and 2, so that from the lower crossbar 6 to a level near the upper crossbar 2 frame 1 increases in width and also projects increasingly in the forward direction. Only slightly below the level of the upper crossbar 2, the two arms 4 and 5 of the frame are bent toward the rear and then terminate with an equal curvature into the crossbar 2. From their lower ends up to this curvature toward the rear each of the two arms 4 and 5 extends substantially parallel to the adjacent outer front edge of a lateral padded bulge 7 or 8, respectively, as shown particularly in FIG. 3. These lateral bulges 7 and 8 are thus able to take up considerable forces which may occur in the transverse direction of the backrest, for example, when the person occupying the seat while driving at a considerable speed along a curve is pressed against one or the other of these lateral padded bulges.

The lower end of each arm 4 and 5 is secured to a hinge fitting 9 or 10 as conventional on the backrests of seats of motor vehicles which are adjustable to different inclinations. The remaining parts of the two hinge fittings and their connection to the frame of the seat, as well as the seat itself are not illustrated since they do not form parts of this invention.

The crossbar 2 of frame 1 carries a perforated plate 11 of a U-shaped cross section which is welded thereto in such a manner that the lower ends of the two arms of the U between which the crossbar 2 is located extend substantially in the longitudinal direction of the backrest.

The backrest according to the invention further comprises a pair of reinforcing strips 12 and 13 for solidifying the upper edge of the padding. Each of these reinforcing strips 12 and 13 is welded at one end to the upper curved part of the perforated plate 11 and at the other end to the rearwardly curved part of the arm 4 or 5. As seen from above, the reinforcing strips 12 and 13 are curved in a similar manner as the corresponding parts of the arms 4 and 5 and each of them is spaced from the adjacent outer front edge of the upper part of the lateral padded bulge 7 or 8, respectively.

Except for its lower side, the perforated plate 11 is embedded in a padding element 14 of a tough foam plastic which together with this perforated plate forms a protective cushion around the crossbar 2. The thickness of the padding element 14 at the rear and upper sides of the perforated plate 11 depends primarily upon the amount of protection which the protective padding should provide, while at the front side it is made of such a thickness that this front side forms a continuation of the front side of the padding.

The other parts of frame 1 do not need to be provided with a protective padding since they are not located within the area in which a person might be propelled from the rear upon the backrest.

Frame 1 and the lower crossbar 6 carry a shell-shaped element 15 which serves as a padding support, and may consist, for example, of compressed pulp, plastic or the like. This shell-shaped element 15 has a sufficient solidity to carry and support the padding 3, although by a sudden impact of a person it will be plastically deformed to such an extent that it cannot cause any dangerous injuries. If the danger of injuries at such an impact should be further reduced, the rear side of the shell-shaped element 15 may be covered with a protective padding 15', for example, of a tough foam plastic or the like.

This shell-shaped element 15 carries lateral padding elements 16 and 17 which are firmly secured thereto and form the lateral bulges 7 and 8 according to a preferred embodiment of the invention consist of foam plastic or foam rubber. These lateral padding elements 16 and 17 limit a central rectangular area which extends from the lower side of the padding element 14 to the lower end of the backrest and merges laterally with the curved, forwardly projecting lateral parts 7 and 8. The lateral padding elements 16 and 17 and the padding element 14, as well as the rear side of the shell-shaped element 15 are covered by an upholstery material.

The central area of the shell-shaped element 15 carries a central padding element 18 which merely rests thereon and, as shown in FIG. 3, has a wider rear side than its front side and thus has a substantially dove-tailed shape. The surfaces of the lateral padding elements 16 and 17 which abut against the sides of the central padding element 18 are rearwardly inclined in accordance with the dove-tailed shape of the central padding element 18 so that the latter cannot fall forwardly.

The rear side of the central padding element 18 and the adjacent front side of the central area of the shell-shaped element 15 are each provided with a coating or sheet 19 of a material which has antifriction properties so that the central padding element 18 may be shifted in its longitudinal direction along the element 15 with relatively small friction while being guided laterally by the lateral padding elements 16 and 17. The central padding element 18 can therefore follow a movement of the upper body of the occupant of the seat in the longitudinal direction, as it occurs, for example, when the seat padding vibrates in this direction.

As illustrated in FIG. 1, the central padding element 18 is provided with a so-called loin support 21, that is, a slight bend at the level of the loins of the occupant of the seat. The moveability of the central padding element 18 in the longitudinal direction may be utilized for effecting a quick adjustment of the loin support 21 to the proper level for the particular occupant of the seat. For still better adapting the shape of the backrest to the particular shape of the back of a person, the invention further provides the central padding element 18 with pockets 22 which are located above and spaced from each other and extend horizontally from one side of this element 18 to the other. These pockets 22 permit additional padding strips of any desired shape or material to be inserted at different levels of the padding element 18. Furthermore, such additional padding strips also permit the width of the backrest to be adjusted since, as may be seen in FIG. 3, a change of the thickness of the central padding element 18 also results in a change in the width of the backrest inasmuch as the lateral bulges 7 and 8 not only project forwardly but also outwardly toward the opposite sides. For inserting or removing the additional padding strips, it is necessary to remove the central padding element 18 in the forward direction.

For also supporting the head of the occupant of the seat, the backrest is provided with a headrest 23 which is secured in a fixed position to the central upper crossbar 2 of frame 1 by means of a pair of supporting rods 24 and 25. Since these supporting rods are rigidly secured and not adjustable, the danger is prevented that these rods might project from the lower side of the protective padding on the central upper crossbar 2 and into the area upon which a passenger may be propelled at an impact upon the front of the car. In order to prevent an impact also upon the parts of the supporting rods 24 and 25 between the upper crossbar 2 and the headrest, 23, the backrest is made of such a height that only a very small gap remains between the upper side of the padding element 14 and the lower side of the headrest 23. Of course, if desired, the headrest could also abut against the upper side of the backrest. The headrest 23 is secured to the two supporting rods 24 and 25 by means of two articulated joints which are movable only when a certain minimum force is exceeded which depends upon the particular construction of these joints. The headrest 23 therefore normally remains in the particular position to which it has been adjusted relative to the backrest even though the latter is pivoted forwardly from its rear position as illustrated in FIG. 1, that is, in the counterclockwise direction as seen in this drawing. The supporting rods 24 and 25 are not connected to the perforated plate 11 which supports the padding element 14 so as to prevent this element from becoming rigid by the supporting rods.

FIG. 4 illustrates another embodiment of the backrest according to the invention which differs from the embodiment according to FIGS. 1 to 3 only by a slightly modified shape of the arms of the frame of the backrest and by a different structure of the padding support. The corresponding parts of the two embodiments will therefore hereafter not again be described.

As shown in FIG. 4, the two arms 104 and 105 of frame 101 project from their lower ends at first forwardly up to approximately the height of the upper area of the chest of an occupant of the seat and then extend again toward the rear and parallel to the front edges of the lateral bulges up to points near the upper crossbar 102 of the frame where the arms 104 and 105 are curved toward this crossbar 102. As seen from the front, the arms 104 and 105 extend slightly toward each other in the upward direction. This results in a backrest which embraces the occupant of the seat laterally within the area of the loins and the chest, but is narrower within the shoulder area without laterally embracing such a person so that the freedom of movement of the arms of this person is not limited. Such a backrest is therefore especially of advantage for a driver's seat, whereas the backrest according to FIGS. 1 to 3 has special advantages when applied to the seat next to that of the driver.

The padding support consists accordingly to FIG. 4 of an elastic mat 115 which is highly elastic in its longitudinal direction. The shape of this mat 115 which is only curved similar to the curvature of the seat depends upon the shape of the frame 101 which consists of the upper crossbar 102 and the two arms 104 and 105, and upon the shape of the lower crossbar 106 since the mat 115 is tightened between these parts. The lower area of the central padding element 118 is connected to the mat 115 which in this particular embodiment of the invention consists of a shirred fabric. Because of the elasticity of this mat 115 in the longitudinal direction, the central padding element 118 may also shift in this direction when this becomes necessary because of a corresponding longitudinal movement of the back of the occupant of the seat. The area of the central padding element 118 of the backrest which is not connected to the mat 115 is covered with a sheet or coating of an antifriction material which reduces the friction between the central padding element 118 and the mat when a relative movement occurs in the longitudinal direction. The central padding element 118 is laterally guided and supported by the lateral padding elements in the same manner as described with reference to FIGS. 1 to 3.

Although my invention has been illustrated and described with reference to the preferred embodiments thereof, I wish to have it understood that it is in no way limited to the details of such embodiments but is capable of numerous modifications within the scope of the appended claims.

I claim:

1. A backrest for a seat, especially for a motor vehicle, comprising a supporting frame having an upper crossbar and lateral arms connected thereto, padding means at least partly supported by said frame and including lateral padded bulges projecting forwardly from a central part of said backrest, said upper crossbar extending within the upper part of said backrest, and at least a part of the length of said lateral arms projecting forwardly from said crossbar, said padded bulges being secured to said lateral arms, at least the central part of said padding means being adapted to engage with the back of an occupant of said seat being provided with transversely extending pockets for receiving removable inserts for changing the cross-sectional shape of said central part.

* * * * *